United States Patent [19]

Hartitz

[11] 4,115,495

[45] Sep. 19, 1978

[54] PROCESSING EXTRUDED THERMOPLASTIC POLYMER

[75] Inventor: Joachim Ernst Hartitz, Avon Lake, Ohio

[73] Assignee: The B. F. Goodrich Company, Akron, Ohio

[21] Appl. No.: 785,264

[22] Filed: Apr. 6, 1977

[51] Int. Cl.² .............................................. B29D 7/04
[52] U.S. Cl. ..................................... 264/90; 264/150; 264/159; 264/177 R; 264/237; 264/284; 264/346
[58] Field of Search .................. 264/150, 210 R, 146, 264/237, 145, 90, 159, 284, 177, 346, 285

[56] References Cited

U.S. PATENT DOCUMENTS

| 2,375,827 | 5/1945 | Slaughter | 264/177 R |
| 2,976,567 | 3/1961 | Jones et al. | 264/210 R |
| 3,281,516 | 10/1966 | Southwick | 264/285 |
| 3,430,994 | 3/1969 | Keeler | 264/177 R |
| 3,454,693 | 7/1969 | Crenshaw | 264/177 R |
| 3,555,135 | 1/1971 | Paul | 264/346 |
| 3,886,250 | 5/1975 | Danko | 264/177 R |
| 3,899,561 | 8/1975 | Heilmayr | 264/177 R |

*Primary Examiner*—Jeffery R. Thurlow
*Attorney, Agent, or Firm*—Joseph Januszkiewicz

[57] ABSTRACT

Method and apparatus for processing extruded thermoplastic material for use in house siding by advancing a hollow extrudate from the die member through cooling and sizing baths followed by stress relieving the extrudate and then cutting the extrudate into separate finished strips for final processing and packing.

7 Claims, 11 Drawing Figures

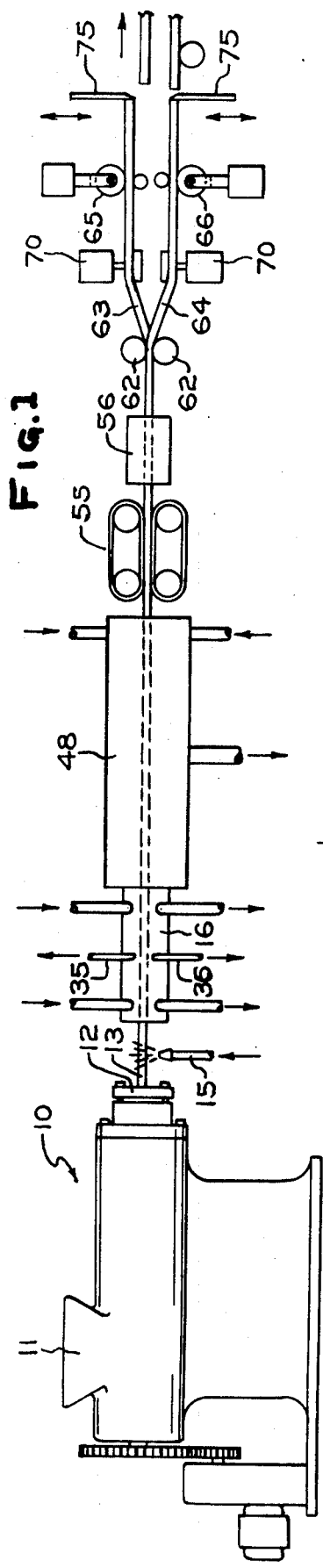
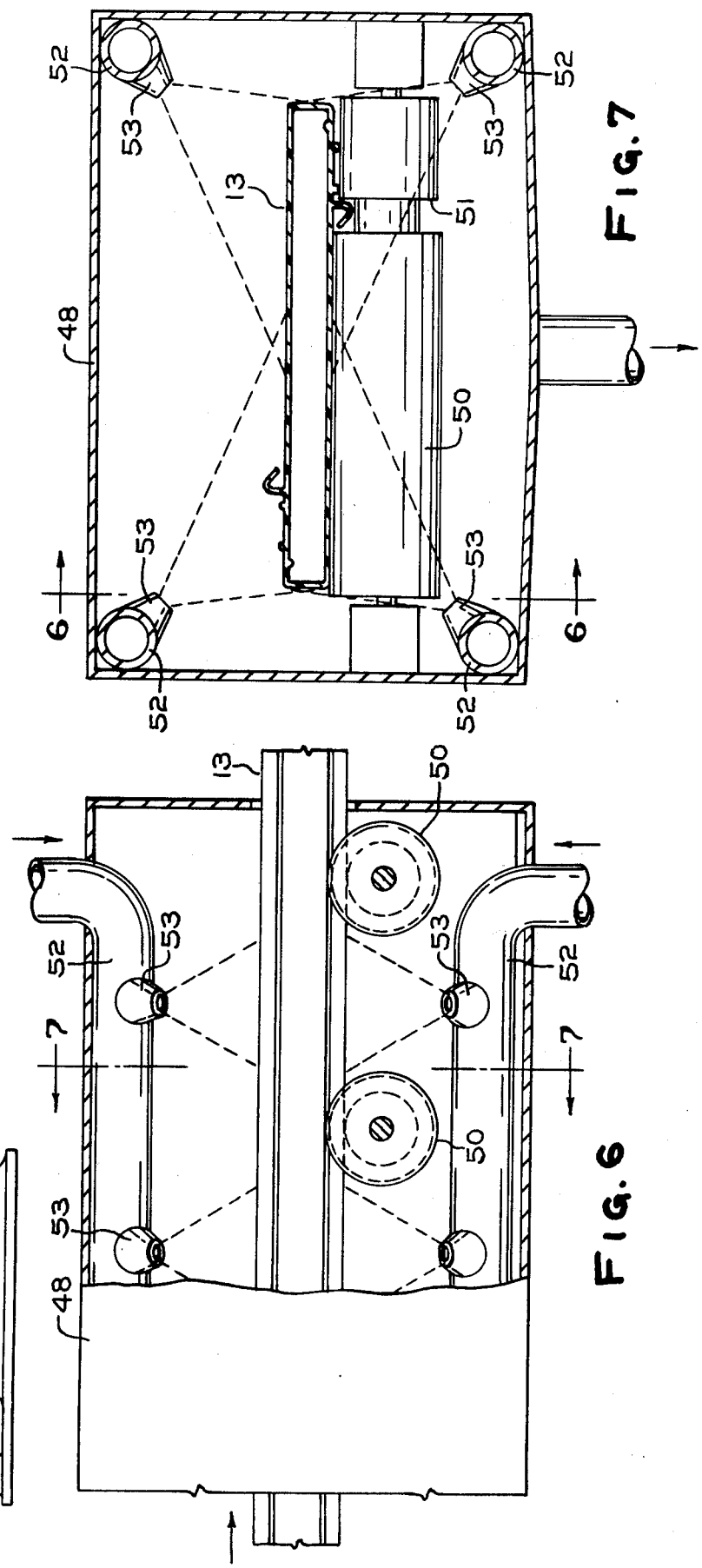

PROCESSING EXTRUDED THERMOPLASTIC POLYMER

BACKGROUND OF THE INVENTION

This invention relates to extruding, and more particularly to a new and improved method and apparatus for extruding thermoplastic polymer house siding.

In the extrusion process of thermoplastic materials, reliance is made on the die means for shaping the product from the extruder. In the manufacture of house siding, the extrudate is a relatively narrow width flat sheet of material having a turned over portion along one side edge to provide an interlock means. To handle this type of shape, the extrudate must be of high viscosity to prevent the distortion of the extrudate and prevent sagging of the siding in processing it. Cooling is generally done by air. The requirement of having a stiff melt in combination with the type of cooling generally applied would restrict the output to a range between 200 and 400 pounds per hour. The present invention provides a means for significantly increasing the extrusion rate by providing a method and apparatus for extruding the thermoplastic house siding at a higher temperature wherein the viscosity is relatively low by providing a novel shape and providing means for handling the low viscosity extrudate. By extruding the thermoplastic house siding in the form of a hollow rectangular shaped extrudate, then applying vacuum sizing techniques to it, has made it much easier to process, handle and size the thermoplastic siding. Since the melt can be processed at a higher temperature better properties such as high mechanical properties and excellent weathering characteristics can be developed in the material.

SUMMARY OF THE INVENTION

The present invention contemplates an apparatus and method wherein an extrudate that is generally rectangular in cross-sectional shape is initially cooled as by a spray, thereafter sized in two successive tanks, and thence stress relieved as by infrared heaters. The extrudate in its hollow shape is thence cut into two separate narrow width siding strips for embossing, after which the siding is cut to length.

BRIEF DESCRIPTION OF THE DRAWINGS

FIG. 1 is a side elevational view, partly schemmatic, of the preferred embodiment showing the continuous line apparatus for forming the house siding.

FIG. 6 is a side elevational view of the cooling tanks with a portion of tank broken away along line 6—6 of FIG. 7.

FIG. 7 is a cross-sectional view of the cooling tank taken along line 7—7 of FIG. 6.

DETAILED DESCRIPTION

Figure 2:
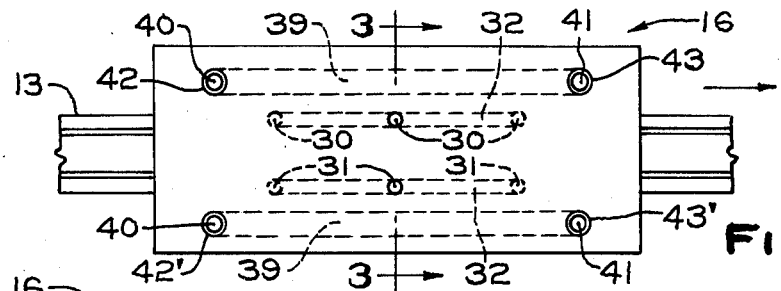
FIG. 2 is a side elevational view of a sizer showing the siding passing therethrough.

Referring to the drawings wherein like reference characters designate like or corresponding parts throughout the several views, there is shown in FIG. 1 an extruder 10 having a hopper 11 and a die means 12 at the forward portion thereof showing an extrudate 13 issuing therefrom. The die member 12 has a die opening that is contoured to a rectangular hollow shape, which in the examples to be described is that of two house siding sheets placed side edge to side edge similar to the configuration shown in FIG. 9.

Figure 3:
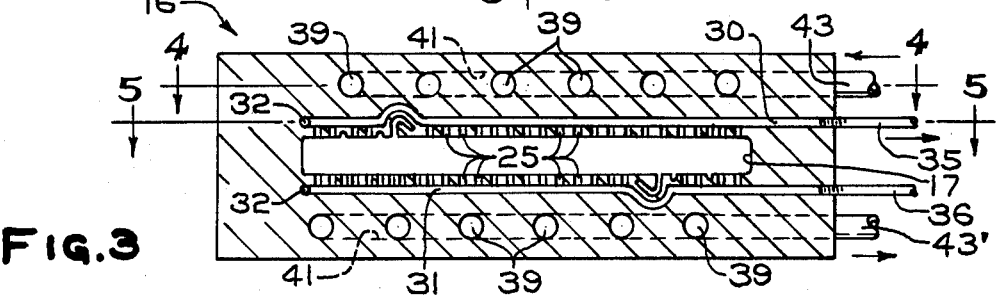
FIG. 3 is a cross-sectional view of the sizer taken along line 3—3 of FIG. 2.
Figure 4:
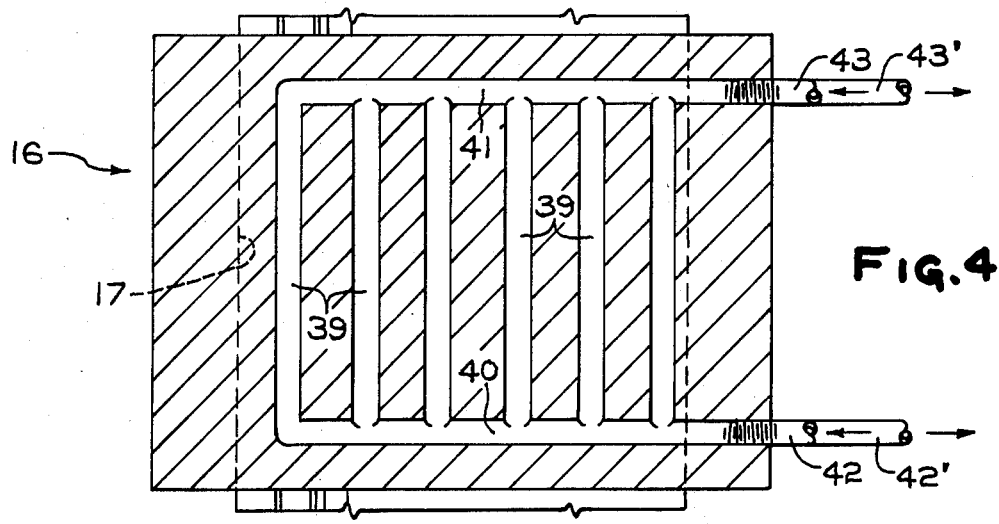
FIG. 4 is a cross-sectional plan view of the sizer taken along line 4—4 of FIG. 3.
Figure 5:
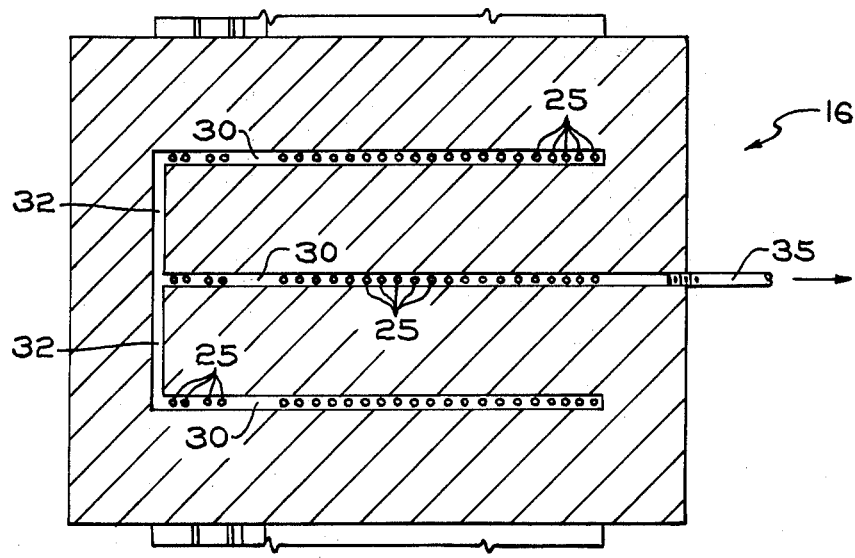
FIG. 5 is a cross-sectional view of the sizer taken along line 5—5 of FIG. 3.
Figure 8:
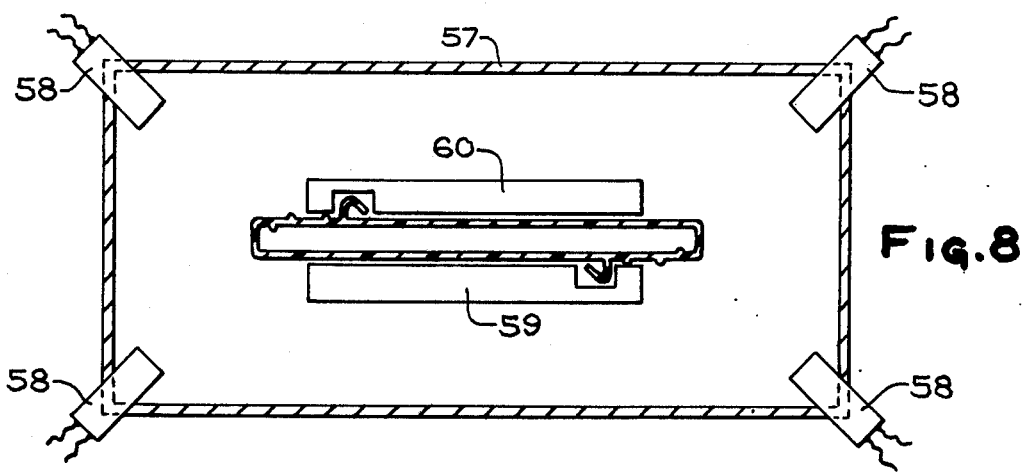
FIG. 8 is a front elevational view of the stress relieving means showing the house siding in rectangular cross-sectional form.
Figure 9:
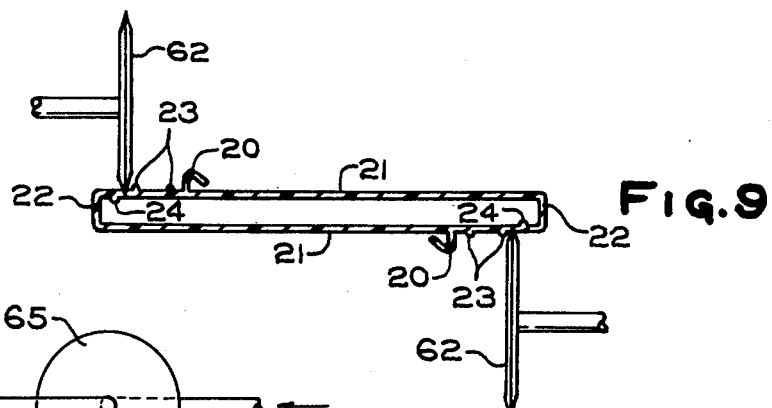
FIG. 9 is a front elevational view of the cutter means for separating the siding into two pieces.
Figure 10:
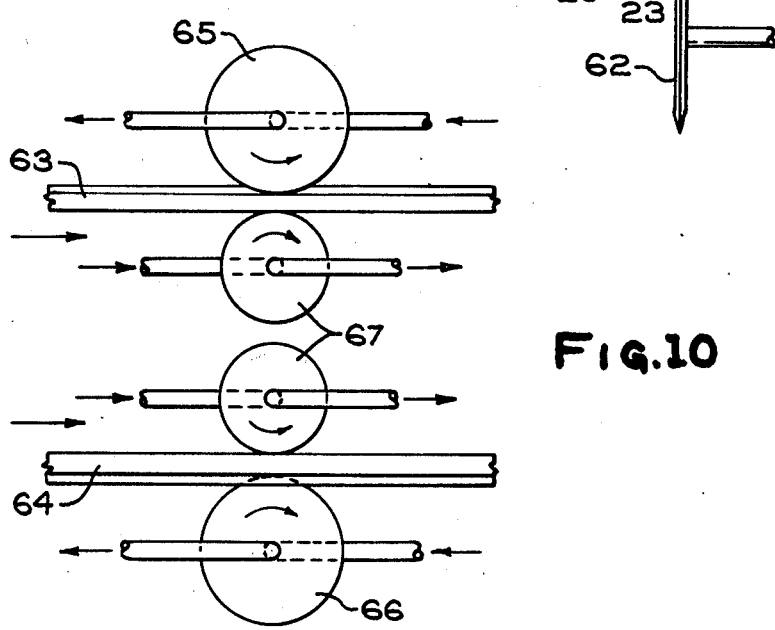
FIG. 10 is a schematic showing of an embossing means.
Figure 11:
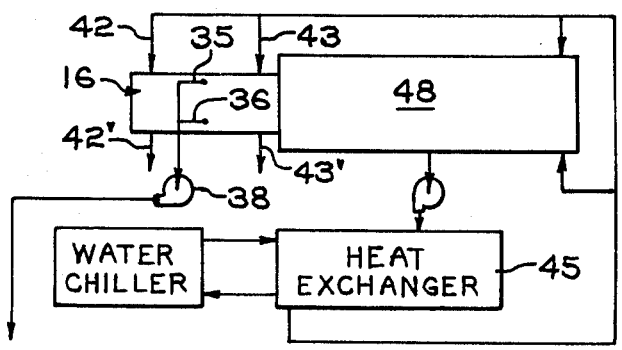
FIG. 11 is a schematic diagram of the cooling means for the sizer and cooling tank.

The hollow extrudate from the extruder 10 is fed past pre-cooling spray means 15 which in FIG. 1 is shown as a single nozzle; however, more than one spray nozzle may be used. The extrudate is then fed to a cooling and shaping housing illustrated generally as 16 located directly in line with the extruder 10. The forward end portion of cooling and shaping housing has a rectangular shaped opening 17 in the form of two house sidings at its forward end, which opening 17 extends as a contoured rectangular shaped groove along the full length of housing 16. As seen in FIG. 9, the siding has a folded over portion or ear projections 20 extending outwardly from the flat planar siding portion 21, a leg portion 22 with a plurality of longitudinally extending ridges 23 on the outer surface and a longitudinally extending ridge 24 on the inner surface. (FIG. 3 shown without extrudate therein for clarity). The single siding panel extends (as viewed in FIG. 9) from between ridges 23-24 on the lower right hand portion of the extrudate to include the left hand leg portion 22 and the adjacent inner ridge 24. The remaining portion forms a second longitudinally extending siding. As the hollow shaped siding passes through the sizer housing 16, a plurality of apertures 25 communicate with the upper and lower planar surfaces of the siding panel. A suitable vacuum is drawn on these apertures to maintain the siding surfaces in full contact with the contoured sizer opening to properly size the extrudate.

Housing 16 has three parallel bores 30 extending into the top portion of the housing and three parallel bores 31 (only one shown in FIG. 3), with their end portion interconnected by suitable bores 32. Bores 30 and 31 are connected to conduits 35 and 36 respectively, which in turn are connected to a vacuum pump 38.

Housing 16's upper and lower sections each have a plurality of horizontally extending parallel bores 39 whose end portions are interconnected by a pair of parallel spaced bores 40-41. The end bores 40-41 (top and bottom) are connected to inlet conduits 42, 43 and outlet conduits 42' and 43' respectively. Conduit 42 is connected to heat exchanger 45 from which cold water is directed to the sizer housing 16 to cool the extrudate passing therethrough.

Thus, the shaped extrudate passing through sizer housing 16 has a vacuum applied to the outer surface to accurately form and size simultaneously cooling the siding.

The extrudate from sizer housing 16 is directed to a cooling tank 48. The front surface of tank 48 has an aperture therein which permits the movement of the extrudate therethrough. The extrudate is supported in its passage through the tank 48 by a plurality of spaced rollers 50 journaled on suitable bearings. The one end of each roller 50 has a recess 51 therein to receive the ear 20 of the extrudate, which acts as a guide to move the extrudate along a straight linear path through the cooling tank. The rear surface of tank 48 has a suitable aperture for the passage of the extrudate therethrough. The tank 48 has a conduit 52 along the upper and lower inside edges. Each conduit 52 has a plurality of nozzles 53 connected on its inner periphery for spraying a cooling fluid onto the outer surface of the hollow extrudate.

The hollow extrudate is then directed by a take away conveyor means 55 to the stress reliever means 56 which in the example shown has a housing 57 with four infrared heaters 58 mounted on the respective inside edges of such housing which direct the heat onto the respective corners of the extrudate as it passes therethrough. The extrudate is guided through the housing by a pair of spaced longitudinally extending guide plates 59 and 60, which in addition shield the remaining portion of the extrudate as it passes through the stress-relieving process.

The hollow extrudate is then directed into the path of a pair of circular cutting means 62 which separates the hollow extrudate into a pair of separate flat house siding panels which are illustrated as 63 and 64 in FIG. 1. The continuous lengths of siding are then directed to the embossing rollers 65 and 66, each having a back-up roller 67. The respective embossing rollers 65 and 66 along with back up rollers 67 are suitably driven and heated to insure the embossing onto such separate sidings. The continuous moving length of siding has elongated holes punched as by puncher 70 along one side thereof, which operation facilitates the fastening of the siding to the side of the house.

Each continuous moving siding is then fed past a guillotine shear 75 (as shown in FIG. 1) suitably powered for intermittent cutting for severing the siding into suitable lengths for stacking and shipping.

In the operation of the method and apparatus described, the extruder 10 extrudes over a suitable mandrel and through a suitable shaped die, an extrudate that is a hollow rectangular shaped member with spaced projections that run the full length of the siding being extruded. As the hollow shaped member issues from the extruder, it is cooled as by a water spray from nozzle 15 as it enters a sizing and cooling housing 16. The extrudate is sized by pulling a vacuum on the outer surface of the extrudate. The extrudate then enters a cooling tank 48 wherein the extrudate is sprayed with a cooling fluid as it is fed by a take-away conveyor 55 into a stress-relieving unit 56. As the hollow extrudate passes through the unit 56, the main portion of extrudate is covered with only the respective corner being exposed to the heating by the infrared heaters 58. The respective corners are stress relieved. After leaving the heating unit 56, the hollow rectangular shaped extrudate is separated by a pair of rotating cutters 62 into two separate L-shaped continuous length portions for passage past drill means 70 which drill holes along one side edge to facilitate the fastening of the siding to the house being sided. The separated sidings are then embossed by heated rollers 65 followed by cutting to predetermined length panels.

Various modifications are contemplated and may obviously be resorted to by those skilled in the art without departing from the described invention, as hereinafter defined by the appended claims, as only a preferred embodiment thereof has been disclosed.

I claim:

1. A method of manufacturing house siding comprising the steps of extruding a hollow rectangular shaped thermoplastic extrudate, cooling said extrudate immediately after said extruding, thence vacuum sizing and cooling said hollow extrudate as it is moved in a linear direction away from said extruder, thence cooling said sized extrudate to ambient temperature, thence heating the respective longitudinally extending corners of said hollow extrudate as it is fed in a direction away from said extruder to stress relieve said corners, cutting said hollow extrudate into continuous two separate flat L-shaped sidings, and thence cutting said sidings into predetermined length panels.

2. A method of manufacturing house siding as set forth in claim 1 wherein said separate flat L-shaped sidings are embossed by heated rolls following said cutting of said hollow extrudate into continuous two separate flat L-shaped sidings.

3. A method of manufacturing house siding as set forth in claim 2 wherein said stress relieving is done along the respective longitudinally extending corners of said hollow extrudate.

4. A method of manufacturing house siding as set forth in claim 3 wherein said heating is infrared heating.

5. The method of preventing warping in extruded house siding comprising the steps of extruding a continuous elongated synthetic thermoplastic extrudate in a heated plastic condition having a hollow rectangular cross section, vacuum sizing and cooling said extrudate, stress relieving said rectangular shaped extrudate, cutting said hollow rectangular shaped extrudate along its continuous length into two separate continuous length siding, and thence cutting said shaped siding into house siding panels of predetermined length.

6. The method of preventing warping in extruded house siding as set forth in claim 5 wherein said vacuum sizing is done on the outer surface of said hollow shaped extrudate.

7. The method of preventing warping in extruded house siding as set forth in claim 6 wherein said hollow extrudate is pre-cooled prior to said vacuum sizing, and embossing said panels of predetermined length after said stress relieving.

* * * * *